United States Patent
Willars (12)

(10) Patent No.: US 6,507,567 B1
(45) Date of Patent: Jan. 14, 2003

(54) EFFICIENT HANDLING OF CONNECTIONS IN A MOBILE COMMUNICATIONS NETWORK

(75) Inventor: Per H. A. Willars, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/288,862

(22) Filed: Apr. 9, 1999

(51) Int. Cl.[7] .................................................. H04Q 7/38
(52) U.S. Cl. ....................... 370/321; 370/347; 370/503; 455/422; 455/436
(58) Field of Search ................................ 455/337, 329, 455/342, 347, 350, 503, 504, 321, 422, 426, 507, 517, 436, 438; 375/355, 356

(56) References Cited

U.S. PATENT DOCUMENTS

| 5,590,177 A | 12/1996 | Vilmur et al. |
| 5,666,348 A | 9/1997 | Thornberg et al. |
| 5,673,259 A | 9/1997 | Quick, Jr. |

FOREIGN PATENT DOCUMENTS

| GB | 2 301 992 | 12/1996 |
| WO | WO 93 21741 A | 10/1993 |
| WO | WO 95 31081 A | 11/1995 |
| WO | WO 95 33347 A | 12/1995 |
| WO | 96/34504 A | 10/1996 |
| WO | WO 96 37079 A | 11/1996 |
| WO | 96/37081 A | 11/1996 |
| WO | 98/03030 A | 1/1998 |
| WO | 98/24250 A | 6/1998 |
| WO | WO 98 37723 A | 8/1998 |

OTHER PUBLICATIONS

*XVI World Telecom Congress Proceedings*, ISS '97, Sep. 21, 1997, pp. 339–345, Andreas Schieder et al., "GRAN[1]– A New Concept for Wireless Access in UMTS".

*IFIP Workshop TC6*, Jul. 2, 1995, pp. 34/1–34/10, XP002085769, Bradford (GB), Z. Fan et al., "ATM Traffic Prediction Using FIR Neural Networks".

*IEEE Network: The Magazine of Computer Communications*, vol. 9, No. 4, Jul. 1, 1995, pp. 34–45, XP000526590, Cui–Qing Yang et al., "A Taxonomy for Congestion Control Algorithms in Packet Switching Networks".

*IEEE Communications*, vol. 15, No. 8, Oct. 1997, pp. 1477–1486, Ermanno Berruto, "Architectural Aspects for the Evolution of Mobile Communications Toward UMTS".

*1993 43rd IEEE Vehicular Technology Conference*, Meadowlands Hilton, Secaucus, NJ, USA, May 18–20, 1993, pp. 520–523, Ermanno Berruto et al., "Variable–Rate for the Best Speech Service in UMTS".

*1994 IEEE*, COMSIG '94, pp. 41–45, M.F. Scheffer et al., "Fuzzy Modeling and Prediction of Network Traffic Fluctuations".

Primary Examiner—Thanh Cong Le
(74) Attorney, Agent, or Firm—Nixon & Vanderhye, P.C.

(57) ABSTRACT

Efficient channel switching procedures are provided in a mobile communications system. A first channel is established to support a connection through a radio access network to a mobile station. Subsequently, if the first channel is no longer used to support that connection, a portion of that first channel is nevertheless maintained for a period of time. That way, if the first channel is again needed to support the connection to the mobile station, the maintained portion of the first channel is simply reactivated thereby reducing channel switching costs and delays associated with channel set-up and release operations. The portion of the first channel that is maintained may be associated with resources within the radio access network. Another portion of the first channel, corresponding for example to a radio channel resource supporting the connection between the radio access network and the mobile station, may be released after the first channel is no longer being used to support the connection in order to make that radio channel resource available for other mobile connections.

40 Claims, 10 Drawing Sheets

EFFICIENT HANDLING OF CONNECTIONS IN A MOBILE COMMUNICATIONS NETWORK

FIELD OF THE INVENTION

The present invention relates to mobile communications, and more particularly, to the efficient allocation and use of resources in a mobile communications network.

BACKGROUND AND SUMMARY OF THE INVENTION

Current mobile telecommunications networks are typically designed to connect and function with Public Switched Telephone Networks (PSTNs) and Integrated Services Digital Networks (ISDNs). Both of these networks are circuit-switched networks and handle relatively narrow bandwidth traffic. However, packet-switched networks, such as the Internet, handle much wider bandwidth traffic. While wire-line communication terminals, e.g., personal computers, are capable of utilizing the wider packet-switched network bandwidth, wireless mobile radio terminals are at a considerable disadvantage because of the relatively limited bandwidth of the radio/air interface that separates the mobile terminals from packet-switched networks. In the second generation Global System for Mobile communications (GSM) mobile communications system, a General Packet Radio Service (GPRS) was introduced to handle "bursty" traffic such as the infrequent transmission of e-mail messages, Internet information, and other data. Because GPRS is a packet-switching service, it only requires radio channel resources when data is actually being sent as compared to typically less efficient circuit-switched services that are reserved for a mobile user regardless of whether data is actually being sent. The GPRS packet-switched service enables the radio frequency spectrum to be more efficiently allocated across voice and data calls and allows channels to be shared between several users simultaneously.

Even though GSM provides both circuit-switched and packet-switched services to mobile users, GSM and other second generation mobile communication systems still suffer from narrow radio bandwidth. Radio access is needed that provides very high data rates and supports enhanced bearer services not realistically attainable with existing generation mobile communication systems. A third generation of mobile systems based on Wideband Code Division Multiple Access (W-CDMA) radio access is being introduced. Unlike narrow band access methods such as Frequency Division Multiple Access (FDMA) and Time Division Multiple Access (TDMA), and to some extent "regular" CDMA, W-CDMA currently supports 5 MHz to 15 MHz of bandwidth, and in the future, promises an even greater bandwidth. In addition to wide bandwidth, W-CDMA also improves the quality of service by providing robust operation in fading environments and transparent handovers between base stations (soft handover) and between base station sectors (softer handover). Multipath fading is used to advantage to enhance received signal quality, i.e., using a RAKE receiver and improved signal processing techniques, contrasted with narrow band mobile communications systems where fading substantially degrades signal quality.

Another limitation with the current GSM system is that it offers basically two categories of services: circuit-switched services through one particular type of network service node, such as a Mobile Switching Center (MSC) node, and packet-switched services offered through another type of network service node, such as a GPRS node. There is one set of channels for circuit-switched services and another different set of channels for packet-switched channels. There is not much flexibility to mix and match particular services to meet often changing needs of mobile subscribers. In contrast, the W-CDMA system provides a wide variety of services and enables flexible allocation of resources and delivery of requested services. Indeed, a single set of channels is used to support both circuit-switched and packet-switched services. Current needs for a particular service are analyzed, and then existing communication resources are flexibly and dynamically assigned taking into account current demands in the system for communications resources.

An example third generation, W-CDMA system, sometimes referred to as Universal Mobile Telecommunications System (UMTS) is shown in FIG. 1. The UMTS 10 includes a representative, connection-oriented, external core network, shown as a cloud 12, may be for example the PSTN or ISDN networks. A representative, connectionless-, external core network, shown as a cloud 14, may be for example the Internet. Both core networks are coupled to a corresponding service node 16. Core network 12 is connected to a connection-oriented service node shown as a mobile switching center node 18 which provides circuit-switched services. In the existing GSM model, the mobile switching center 18 is connected over an interface A to a Base Station System (BSS) 22 which in turn is connected to a radio base station 23 over an interface Abis. The Internet connectionless-network 14 is connected to a GPRS node 20 tailored to provide to packet-switched services. Each of the core network services 18 and 20 connects to a UMTS Terrestrial Radio Access Network (UTRAN) 24 over a Radio Access Network (RAN) interface. The UTRAN 24 includes plural Radio Network Controllers (RNCs) 26. Each RNC 26 is connected to a plurality of base stations (BS) 28 and to any other RNCs in the UTRAN 24. Radio communications between the base stations 28 and mobile stations (MSs) 30 are by way of a radio/air interface.

In the preferred example embodiment, radio access is based on WCDMA with individual radio channels being allocated using WCDMA spreading codes. The UTRAN 24 provides services to and from mobile stations over the radio interface for the external core networks 12 and 14 (and ultimately to external, core network end users) without then having to request specific radio resources necessary to provide those services. The UTRAN 24 essentially hides those details from the service nodes, external networks, and users. Instead, a "logical" radio access "bearer" is simply requested from UTRAN 24 by a service node 16. A radio access bearer corresponds to the UTRAN service actually carrying user data through the UTRAN and over the radio interface. The term "connection" corresponds to the collection of all radio access bearers plus the control signaling associated with one particular mobile station.

It is the task of the UTRAN 24 to map the mobile connection onto physical transport channels in a flexible, efficient, and optimal manner. Thus, each service node simply requests one or more radio access bearers with a mobile station where each bearer may have an associated quality of service. Quality of service may include for example a desired bit rate, an amount of delay before information is transferred, a minimum bit error rate, etc. The UTRAN 24, in response to radio access request to support a connection, assigns transmission resources (e.g., an ATM transport connection) through the UTRAN 24 and a radio channel (e.g., a spreading code) over the radio interface.

In mapping a radio access connection onto one or more specific radio channels, the UTRAN 24 flexibly balances and optimizes a number of parameters including quality of service, range (distance between mobile station and base station), traffic load-capacity, and mobile station transmission power. One of two different types of radio channels may be selected by the RNC 26 to support a mobile connection: a dedicated or a common channel. The two radio channel types differ by the degree of radio resource reservation per channel. For a dedicated radio channel, resources in terms of spreading code(s) and power/interference are allocated to this particular mobile station. A common radio channel is a resource (spreading code) that is shared dynamically between multiple mobile stations. Based on the requested quality of service and the current traffic conditions, the RNC 26 may select the type of radio channel to carry the information associated with the radio access bearer service request.

As an example, if high quality of service with low delay guarantee is required, the RNC 26 may map the connection onto a dedicated channel. Moreover, a dedicated channel supports diversity handoff including soft and softer handoff as well as fast power control. These features improve the quality of communications in CDMA communications, and also provide for efficient transfer of a continuous stream of data. For delay tolerant, infrequent, or small size packet data, the RNC 26 may map a connection onto a common (shared) packet channel. Although a dedicated channel may use radio resources inefficiently because the channel remains dedicated even when no information is being transmit, a common-type channel offers connectionless transport that can be scheduled providing a more efficient use of the radio channel resources.

Using the best type of channel may be important even during the life of a single radio access bearer. In fact, switching of the type of channel supporting an ongoing radio access bearer may be initiated because:

channel conditions have changed a radio access bearer has been added to or removed from the connection the amount of packet data to be transmitted has changed significantly.

For example, a connection exists between one mobile station and the network with one radio access bearer established for background packet data. The connection employs a common channel. If the user initiates a speech call, then an additional radio access bearer for the speech is established. The connection then includes two radio access bearers. Since the speech requires a radio access bearer with low delay and resource reservation requiring a dedicated channel, the connection will be switched to a dedicated channel. As another example, a dedicated channel may be set up to support a connection in which a large amount of data is initially transmit over a radio access bearer. After that transmission, small amounts or bursts of data may be transmitted more efficiently on a common packet-type of channel resulting in a switch from a dedicated channel to a common channel to support the connection. Moreover, it may be efficient or even necessary to switch the connection back to a dedicated channel if the amount of data or traffic conditions or other factors demand.

However, channel-type switching to maximize the use of radio resources to accommodate a requested service, adapt to current traffic conditions, etc. incurs a "channel switching cost." Setting up and taking down a channel requires a certain amount of data processing resources and a specific amount of delay time to perform. For example, before switching from a common-type channel to a dedicated channel, the "serving" RNC for a connection (and possibly other RNCs supporting the connection), must first reserve transmission resources between the serving RNC (and any other supporting RNCs) and the base station as well as request the base station to set up both hardware and software resources for this particular connection. After switching from a dedicated to a common-type channel, the serving RNC orders the base station to release all base station resources related to the dedicated connection and also releases dedicated channel transmission resources for this connection in the UTRAN. Each channel-type switch may incur set-up/release costs for multiple, parallel transmission bearers if the connection requires support of multiple services and/or multiple transport channels. When using a dedicated channel, there is normally a transport channel for each radio access bearer. Each transport channel uses its own UTRAN transmission resource, e.g., an AAL2/ATM connection, between the RNC and the base station when using a dedicated channel. Switching from a common type radio channel to a dedicated radio channel may also require other procedures including, for example, reserving a diversity handover resource in the RNC. Switching in the other direction from a dedicated channel to a common channel is not as costly because the common channel was already established when the system was configured and typically remains established as long as the system is operational.

It would be desirable to reduce channel-type switching costs if possible without sacrificing the flexibility and efficiency that channel-type switching offers.

A channel switching cost is also incurred during handover operations. While handover operations in general provide mobility and other advantages, e.g., diversity handover improves the quality of communication, there is a cost in adding and releasing the mobile connection in each cell involved in a mobile handover operation. The cost of a new cell to support the connection includes, for example, network signaling to reserve resources in the base station, establishing a transmission resource between the network and the base station, signaling between the mobile station and the base station to add a particular cell, and performing these operations in reverse sequence when a cell is no longer supporting a connection. In soft handover procedures, before adding a cell to a set of cells currently supporting a connection, a serving RNC must first request the base station (possibly by way of another supporting RNC) to set up both hardware and software resources for this particular connection as well as establish transmission resources between the serving RNC and the base station possibly by way of a supporting RNC. If the mobile is ordered to release a cell from the current set, the serving RNC (and possibly other supporting RNCs) releases the transmission resources between the RNC(s) and the base station as well as the resources in the base station. In cases where several parallel services require multiple transport channels, each addition/drop of a cell incurs the set-up/release of several parallel transmission resources.

The adding and dropping of cells in handover uses precious radio resources and is often triggered by rapid changes in the radio environment. Therefore, the faster cells can be added and dropped, the better the handover operation adapts to the current radio environment. It is not uncommon for a mobile station to be located at the border between two or more cells, and in that situation, cells may be added and dropped several times during the life of a connection in order to optimize radio performance, e.g., due to fast multipath fading, etc. If the set-up and release procedures between the RNC(s) and base station(s) just described are employed for each addition/release of a cell, the rate at which soft handover is performed is limited both by the data processing load incurred and by the delay in executing each cell addition or release.

It is an object of the invention to provide flexible and efficient allocation of resources in a mobile communications system.

It is an object of the present invention to minimize channel switching costs including delay such as those associated with channel-type switching and handover operations.

It is an object of the present invention to provide different levels of adaptiveness to various situations, including the radio environment, user data traffic, etc. for handling radio resources and radio network resources that support a particular connection. For example, it may be desirable in some situations to provide rapid allocation of radio resources to optimize radio interface performance in response to changing conditions while providing less rapid response within the radio access network.

The present invention provides a solution to the problems described above and meets these and other objects by providing efficient channel switching procedures in a mobile communications system. In general, a first channel is established to support a connection through a radio access network to a mobile station. Subsequently, if the first channel is no longer used to support that connection, a portion of that first channel is nevertheless maintained for a period of time. That way, if the first channel is again needed to support the connection to the mobile station, the maintained portion of the first channel is simply reactivated thereby avoiding channel switching costs associated with channel set-up and release operations. The portion of the first channel that is maintained may be associated, for example, with resources in the radio access network. Another portion of the first channel, corresponding to a radio channel resource supporting the connection between the radio access network and the mobile station, may be released after the first channel is no longer being used to support the connection in order to make that radio channel resource available for other mobile connections.

The radio channel resource may be viewed as a single resource or as plural resources. In the latter situation, plural radio channel resources may include for example (1) spreading codes or other physical radio channels and (2) power resources. It may be preferable in some situations to only release one of the plural radio channel resources. For example, a power resource is released simply by stopping transmission using an assigned spreading code. However, the spreading code itself is not released to be used in other connections. This provides particularly fast release and re-establishment procedures because spreading code de-allocation and re-allocation signaling with the RNC is avoided. A simple "transmission ON" or "transmission OFF" signal may be sent "in-band" over the established dedicated transport channel and radio channel. In addition, the interference level is reduced which is very desirable in spread spectrum based communications systems.

The first channel may correspond in one example to a dedicated type of channel that is reserved just for the connection with the mobile station. The connection is switched to a second type of channel corresponding to a common channel that is not reserved for a particular mobile station, i.e., it is shared by plural mobile stations. The invention allows the connection to be quickly and efficiently switched back to the dedicated channel.

In another example, the first channel is one of plural channels established between the mobile station and the radio access network in accordance with a handover operation. During the handover operation, the connection is handed over from a first radio access network cell where the first channel is established to a second radio access network cell where a second channel is established to support a connection from the radio access network to the mobile station.

The portion of the channel that is maintained for a period of time after the channel is no longer being used to support the connection may include plural subportions. Any of the subportions may be maintained or released as desired when that channel is no longer needed. For example, a first subportion may be associated with resources within a radio network control node such as the RNC in FIG. 1. A second subportion may correspond to transmission resources on the link between the radio network control node and a base station. A third subportion may be associated with resources within the one base station. A fourth subportion may correspond to one of plural radio resources.

By maintaining one or more portions of the first channel, the signaling and processor costs as well as the delay associated with re-establishing that first channel are reduced. In addition, the radio resource(s) used to complete the channel between the base station and the mobile station can be quickly and selectively released. Quick release and re-establishment of the channel makes quick radio resource reallocations possible, thereby ensuring that the limited radio resources are optimally utilized.

BRIEF DESCRIPTION OF THE DRAWINGS

The foregoing and other obects, features, and advantages of the invention will be apparent from the following description of preferred embodiments as well as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the invention is described in the context of two embodiments. These embodiments are only examples and are in no way limiting to the scope of the invention defined by the claims. In other instances, detailed descriptions of well-known methods, interfaces, devices, and signaling techniques are omitted so as not to obscure the description of the present invention with unnecessary detail.

Figure 2:
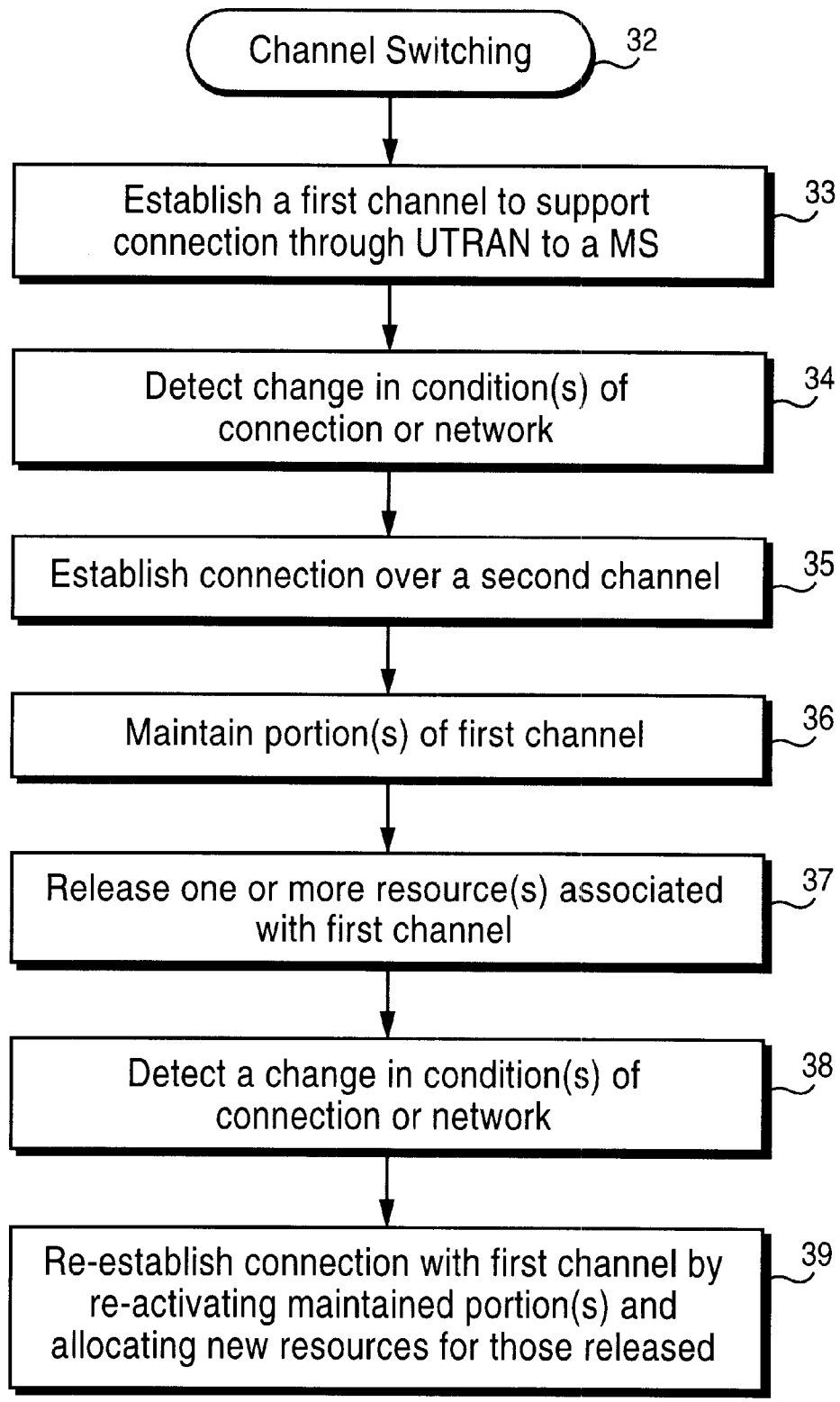
FIG. 2 is a flowchart diagram illustrating a channel switching routine in accordance with the invention.

FIG. 2 illustrates in flowchart format a channel switching routine (block 32) which sets forth example procedures that may be used in implementing the invention. Of course, those skilled in the art will appreciate that other steps and procedures may be employed as well. A first channel is established to support a connection through the UTRAN or other radio access network to a mobile station (block 33). As set forth above, for purposes of description, the term "connection" refers to a "logical" connection between a mobile station and another user such as a core network user or other mobile station. This connection may include one or more data streams associated with the mobile station, e.g., a voice data stream, a video data stream, a file transfer data stream, an e-mail type data stream, etc. The establishing procedure includes mapping the logical connection to a physical channel that physically conveys the connection information to and from the mobile station.

A change in one or more conditions of the connection itself or of the network is detected (block 34). For example, the amount of information for the connection to be transmit has changed significantly, the traffic demand has increased or decreased, the interference level in the cell in which the mobile station is currently located has changed, the mobile station has moved to a location that initiates a handover operation, etc. Accordingly, the connection is established over a second channel (block 35). But even though the connection is now established over this second channel, one or more portions of the first channel are maintained (block 36) even if those portions of the first channel are no longer being used. On the other hand, one or more resources associated with the first channel may also be released (block 37). For example, the radio resource, corresponding in the example wideband-CDMA system to a spreading code, is preferably released so that it can be used for another mobile connection. Thereafter, if the connection is re-established with the first channel (block 39), the maintained one or more portions of the first channel are simply reactivated thereby avoiding the channel take down and set-up procedures that would otherwise have to be performed. For those one or more resources of the first channel which were released in step 37, new resources are allocated to replace those that were released.

One of the benefits of the present invention is the flexibility to designate some portions of a channel as being better-suited to be maintained for longer periods of time, and other channel portions to be released more quickly. For example, certain portions of the channel within the radio access network may be better suited for the former treatment, while certain radio resources may be better suited for the latter (although not necessarily so in all situations). Moreover, the designation of certain portions of the channel as being maintained longer or released more quickly may be changed as necessary.

Figure 3:
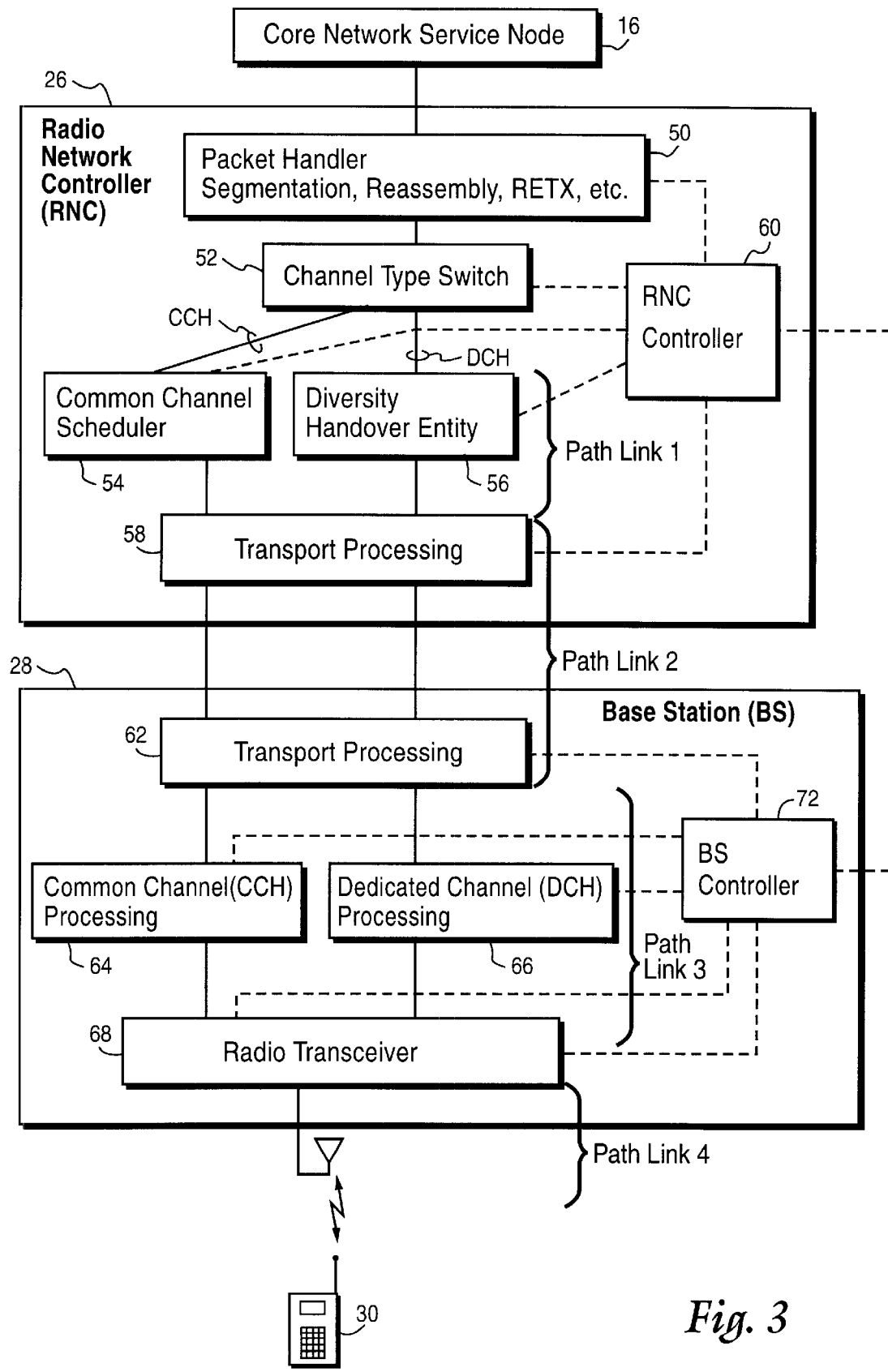
FIG. 3 is a function block diagram illustrating a channel-type switching example embodiment of the present invention in the context of the system shown in FIG. 1.

Reference is now made to FIG. 3 which shows a function block diagram of the mobile communications system 10 in which a first, non-limiting, example embodiment of the invention applied to channel-type switching may be employed. The radio network controller (RNC) 26 (only one is shown to simplify the illustration) includes a number of functional entities such as a packet handler entity 50, a channel-type entity switch 52, a common channel scheduler entity 54, a diversity handover unit 56, a transport processing entity 58, all of which are controlled by an RNC controller entity 60. The RNC transport processing entity 58 interfaces with a base station transport processing entity 62. The base station 28 also includes a common channel processing entity 64, a dedicated channel processing entity 66, and a radio transceiver 68 all controlled by a base station controller entity 72. Separate transceivers may be employed.

The functions of the above entities may be performed for example at a media access control (MAC) protocol level. At the MAC level, the information from a logical connection is mapped onto physical transport media includes common type physical channels shared by plural mobile stations and dedicated channels which are allocated to a particular mobile for a particular period of time. Of course, other types of channels may be included. The packet handler entity 50 is coupled with the channel-type switch entity 52. The RNC controller entity 60 detects various changes in conditions of the connection or network and controls whether the channel-type switch entity 52 switches the packets of information corresponding to the connection to the common channel scheduler entity 54 or the diversity handover entity 56. The common channel scheduler entity 54 collects data packets for this and likely other connections and provides them to the transport processing entities 56 and 62 and base station common channel processing entity 64 to be transmit over the radio interface. The diversity handover entity 56 sends data packets corresponding to the connection to two or more base station cells (if the mobile station is currently in a handover operation) through transport processing entities 56 and 62, base station dedicated channel processing entity 66, and radio transceiver 68. The RNC controller entity 60 and the base station controller entity 72 coordinate these various operations as well as similar operations for connection data communicated uplink from the mobile.

The various links or portions of the common channel, the channel type switch entity 52, the common channel scheduler entity 54, transport processing entities 58, 62, common channel processing entity 64, and radio transceiver 68 are established and configured when the mobile communications system is configured. Accordingly, there is no need to take down or re-establish the common channel for various connections. The mobile station 30 simply transmits or receives on the configured, quasi-permanent control channel using the common control channel spreading code. On the other hand, dedicated channels are typically set-up and taken down for each mobile connection incurring the data processing and delay cost associated therewith. The cost associated with channel-type switching effected by the channel-type switch entity 52 in response to commands from the RNC controller entity 60 may be reduced as follows.

The dedicated channel may be divided into two or more path links. In the non-limiting example shown in FIG. 3, four path links are illustrated: path link 1 corresponds to the resources within the RNC needed for the dedicated channel which includes the diversity handover entity 56. Path link 1 requires the following channel set-up and take down functions: allocation of the diversity handover entity 56 and connection to the transmission resources provided by 58. Path link 2 corresponds to transmission resources on the link between the transport processing entities 58 and 62 in the RNC 26 and the base station 28. Channel set-up and take down functions for path link 2 include allocation/release of transmission resources on the link and signaling to establish/release the transport path, (e.g., for AAL2/ATM, the protocol Q.AAL2 may be used to signal the establishment of the AAL2 connection between the RNC and the BS). Path link 3 corresponds to the resources within the BS including the channel link between the transport processing entity 62 and the radio transceiver 68. Path link 3 requires the following channel setup and take down functions: allocation/release of signal processing resources in the BS hardware devices. Finally, path link 4, which corresponds to the radio link itself, includes the following set-up and take down functions: allocation/release of spreading codes and transmission power. The reservation, set-up, and take down of the path links 1, 2, and 3 require both data processing resources and time to accomplish. This is particularly so if the dedicated channel connection supports multiple data streams/services/bearers because at least path links 2 and 3 are typically established/released for each data stream/service/bearer.

In accordance with this non-limiting example of the present invention, path links 1, 2, and 3, after having been initially reserved and set-up for a connection, may be maintained after the connection is switched over to the common channel for a certain period of time so that if the channel type supporting the connection is switched back to a dedicated channel by the channel-type switch entity 52, there is no need to repeat the reservation and set-up procedures for these links. Moreover, the take down procedures for path links 1, 2, and 3 did not need to be performed when the channel-type switch was first made from a dedicated channel to a common channel. On the other hand, because the radio resources are scarce in the mobile communications system, path link 4 may not be maintained when the connection is switched to a common channel. Therefore, the path link 4 is released, and then later reserved and re-established, using traditional procedures if the connection is switched back to the dedicated channel. The set-up and take down costs associated with path link 4 are usually worth paying in order to have the radio resource(s) available for other connections.

Alternatively, the radio channel resources may be treated selectively. For example, the radio channel resources may include: (1) spreading codes (or other type of physical radio channels) and (2) power resources. It may be preferable in some situations to only release the power resource and maintain the reservation of the already-allocated spreading code. A power resource is released simply by stopping transmission using an assigned spreading code. While the spreading code itself is not released and therefore may not be used in other connections, maintaining the spreading code provides a particularly fast release and re-establishment procedure. Spreading code de-allocation and re-allocation signaling with the RNC is not needed. Instead, a simple "transmission ON" or "transmission OFF" signal may be sent "in-band" over the established dedicated UTRAN transport channel and radio channel. In addition to further reducing the channel type switching cost and delay, the interference level is reduced which is very desirable in spread spectrum based communications systems.

Of course, all of the path links or portions thereof need not be maintained together or for the same time period. Indeed, just one or two of the path links or portions thereof may be maintained depending upon the tradeoff between making a particular category of path link resource available within the UTRAN versus the data processing and delay cost with taking down and setting those path links back up should a connection be switched back to the dedicated channel. On the other hand, three path links 1, 2, and 3 and/or a portion of path link 4 could be treated as a single UTRAN path link (at least conceptually) which is maintained for a certain period of time while the path link 4 or only a portion of path link 4 between the UTRAN and the mobile station is not maintained after a channel-type switching operation. If that time period expires before the connection is switched back, the maintained path link is released for use by the UTRAN to support other connections.

Figure 4:
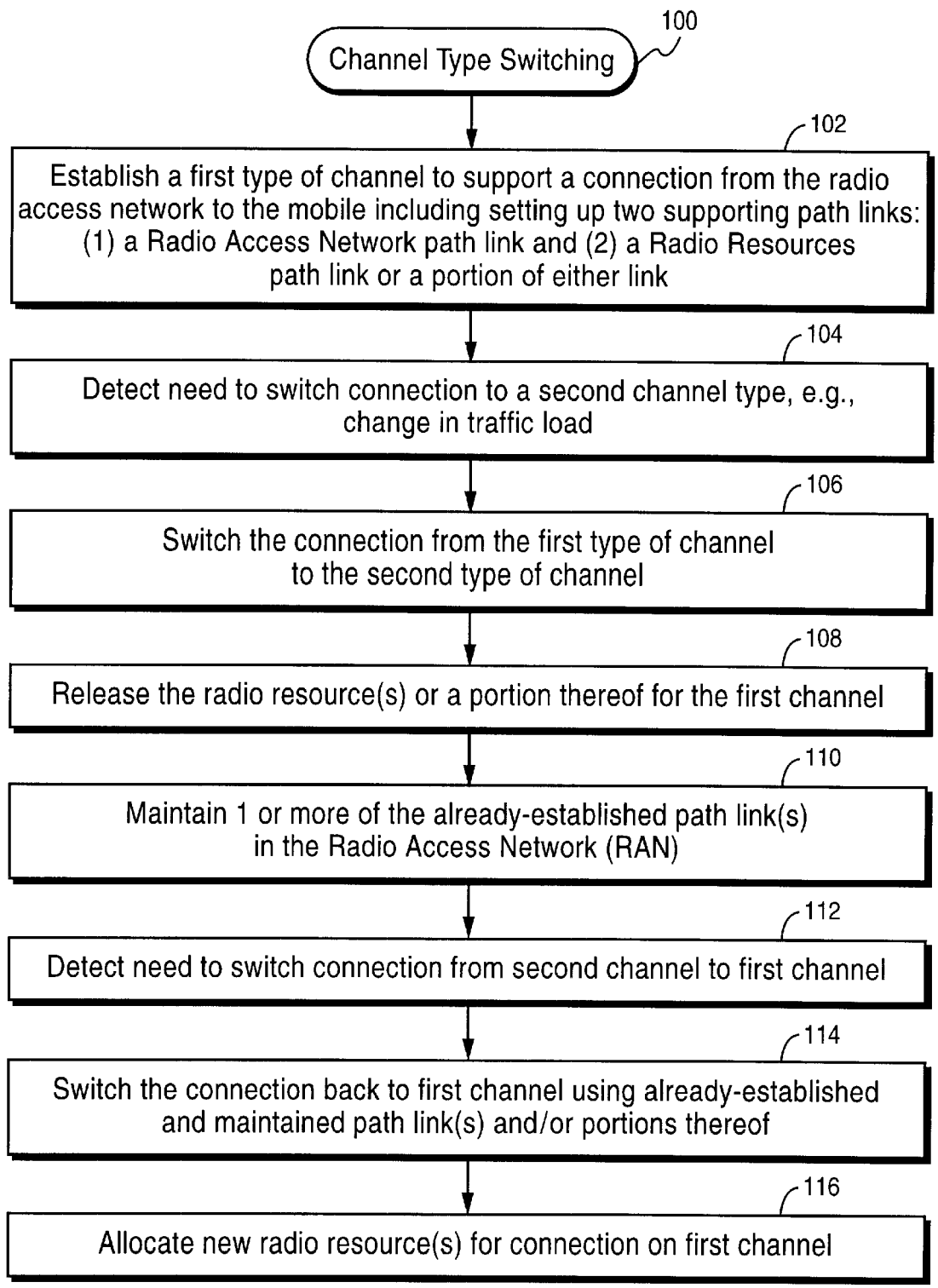
FIG. 4 is a flowchart outlining example procedures in accordance with the channel-type switching example embodiment of the present invention.

An example set of procedures corresponding to a channel-type switching routine (block 100) is illustrated in flowchart format in FIG. 4. A first type of channel connection is established from the UTRAN to the mobile station including setting up two channel path links including at least one radio access network path link and a radio resource path link (block 102). More than one radio access network link is employed as described with respect to FIG. 3. In the example in FIG. 3, this first type of channel is a dedicated channel established by the RNC controller entity 60. The RNC controller entity 60 detects a need to switch the connection to a second channel type, (for example because the traffic load in the current cell has changed), and issues a channel-type switch command to the channel-type switching entity 52 (block 104). The channel-type switching entity 52 switches the connection from the first type of channel to a second type of channel. In the FIG. 3 example, the second type of channel corresponds to a common type channel shared by plural mobile stations (block 106). One or more radio resources are released for the first channel, i.e., path link 4 or a portion thereof (e.g., the power resource is released), in order to make such resource(s) available for other mobile connections (block 108). The already-established path link(s) in the UTRAN for the connection or some portion thereof is (are) maintained for a predetermined period of time before being released (block 110).

The RNC controller entity 60 detects a need to switch the connection back from the second type of channel to the first type of channel, (for example, the traffic load changes again or the service is upgraded), and issues a channel-type switching command to channel-type switching entity 52 (block 112). Entity 52 switches the connection back to the first type of channel (e.g., a dedicated channel in FIG. 3) using the already-established and maintained UTRAN path link(s) or portions thereof (block 114). Each maintained path link of portion thereof is simply reactivated without incurring typical channel take down and set up costs for that link or portion. A new radio resource or resources (e.g., corresponding to path link 4 or a portion thereof in FIG. 3) are then allocated for the connection (block 116).

Figure 5A:
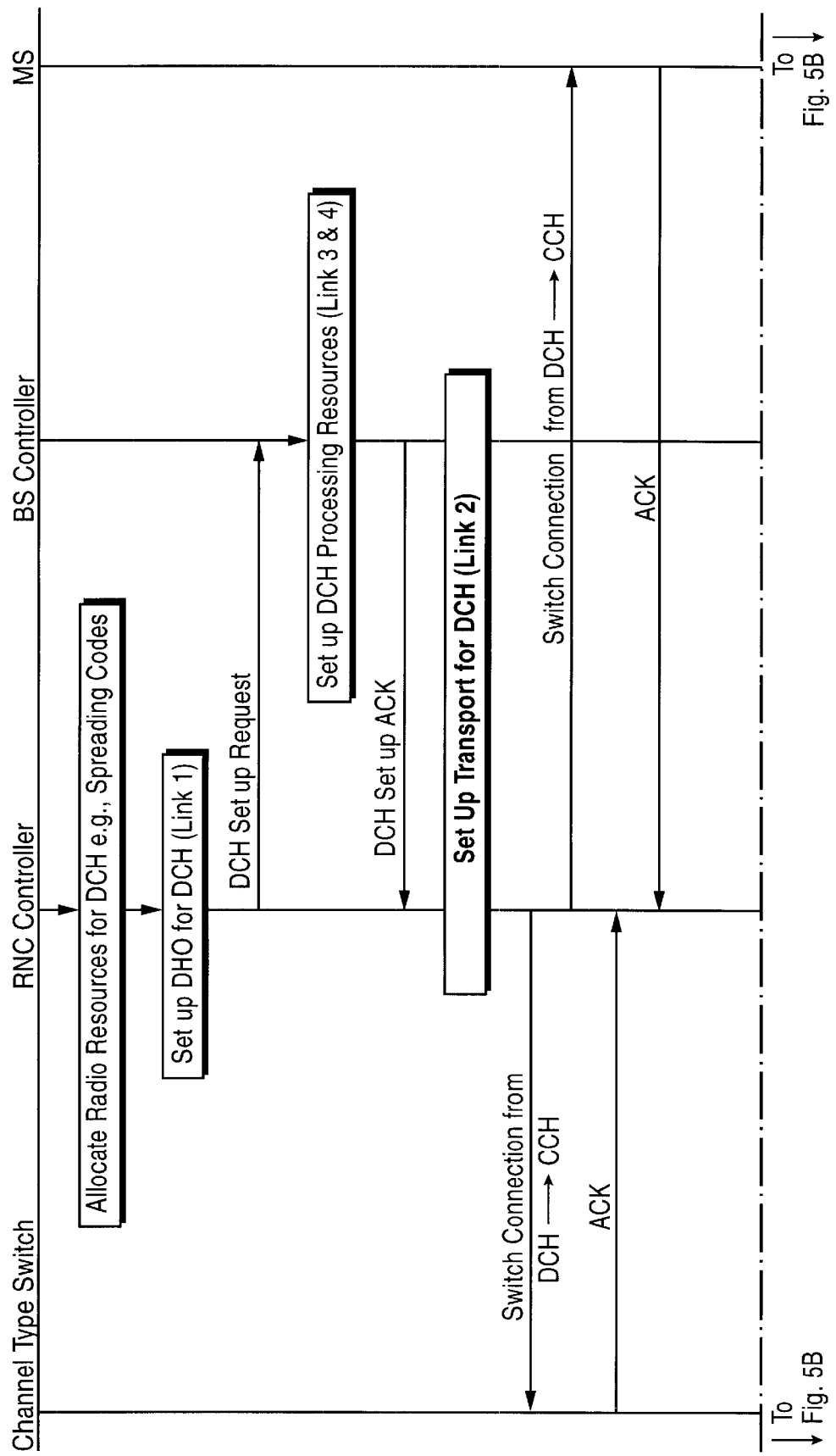
FIG. 5 is an example signaling diagram associated with the first channel-type switching embodiment.
Figure 5B:
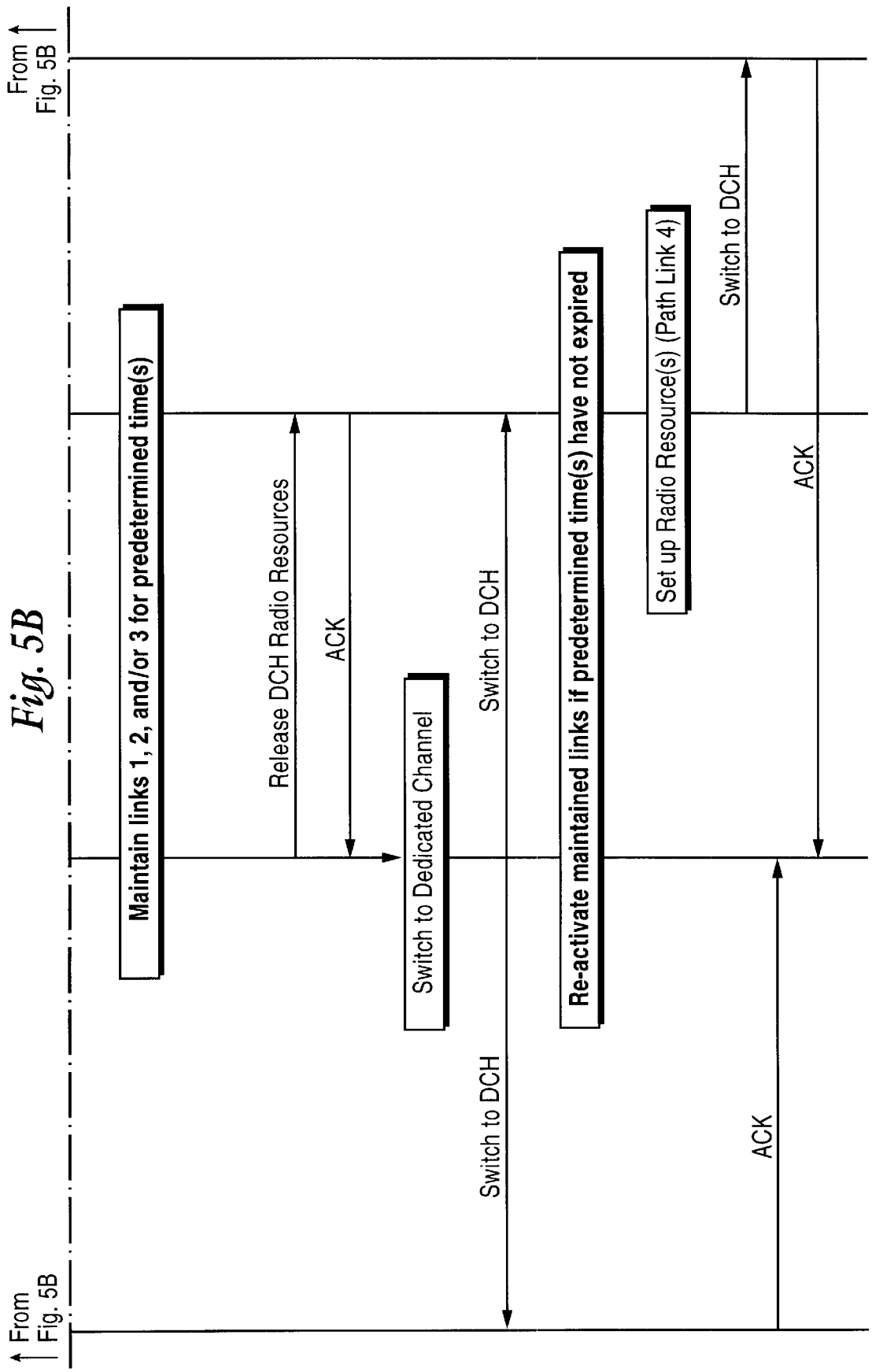

FIG. 5 is a non-limiting, example signaling diagram illustrating various functions and control signals performed by the channel-type switch, the RNC controller, the base station controller, and the mobile station. Initially, the RNC controller allocates radio resources for a dedicated channel to support a connection to the mobile, e.g., one or more spreading codes and power resources. A diversity handoff unit is reserved and configured for the dedicated channel corresponding to path link number 1. A dedicated channel set-up request message is sent to the base station controller entity which then reserves and sets up the necessary dedicated channel processing resources at the base station including establishing path links 3 and 4. When completed, the base station controller sends a dedicated channel set-up acknowledgement message (ACK) back to the RNC controller. The RNC controller and the base station controller both set up a transport link for the dedicated channel corresponding to path link 2 in FIG. 3.

The dedicated channel having been set up, the RNC controller sends a switch connection message to the RNC channel-type switch entity to switch from a dedicated channel to a common channel because of the change in a condition detected by the RNC controller. The RNC controller sends a switch connection message (DCH→CCH) to the mobile station. Both the channel-type switch entity and the mobile station send an acknowledgement message (ACK). The RNC controller then sends a command to the base station controller to release the dedicated channel radio resources or portion thereof (path link 4) and the base station controller sends an acknowledgement (ACK) when those radio resources are released.

Sometime thereafter, a decision is made by the RNC controller to switch back to the dedicated channel because of some change in condition. The RNC controller issues a switch to dedicated channel message to both the channel-type switch entity and to the base station controller. The RNC and base station controller entities reactivate the maintained links or portions thereof if the predetermined times associated with those links have not expired. The base station controller also sets up the radio resources to replace the previously released path link 4 or portion thereof to complete the dedicated channel and issues a switch to dedicated channel command to the mobile station. Both the mobile station and the channel-type switch send an acknowledgement message to the RNC controller entity when the channel-type switch has been accomplished.

Another example application of the present invention is to handover. As a mobile station moves about a mobile communications network, it receives signals transmitted from one or more base station cells better than the signal quality that it receives from other base station cells. There are three types of handover including hard handover, soft handover, and softer handover, and the present invention may be applied to all three. In hard handover, the connection is "broken" from an old base station cell before the connection is "made" at the new base station cell. In soft handover, the connection is made with the new base station cell before the connection is broken with the old base station cell. In softer handover, the concept of a base station cell is extended to individual base station sector antennas where one or more sector antennas transmits to a corresponding sector cell. The connection with a new sector cell is (like soft handover) made before the connection with the old sector cell is broken.

Figure 6:
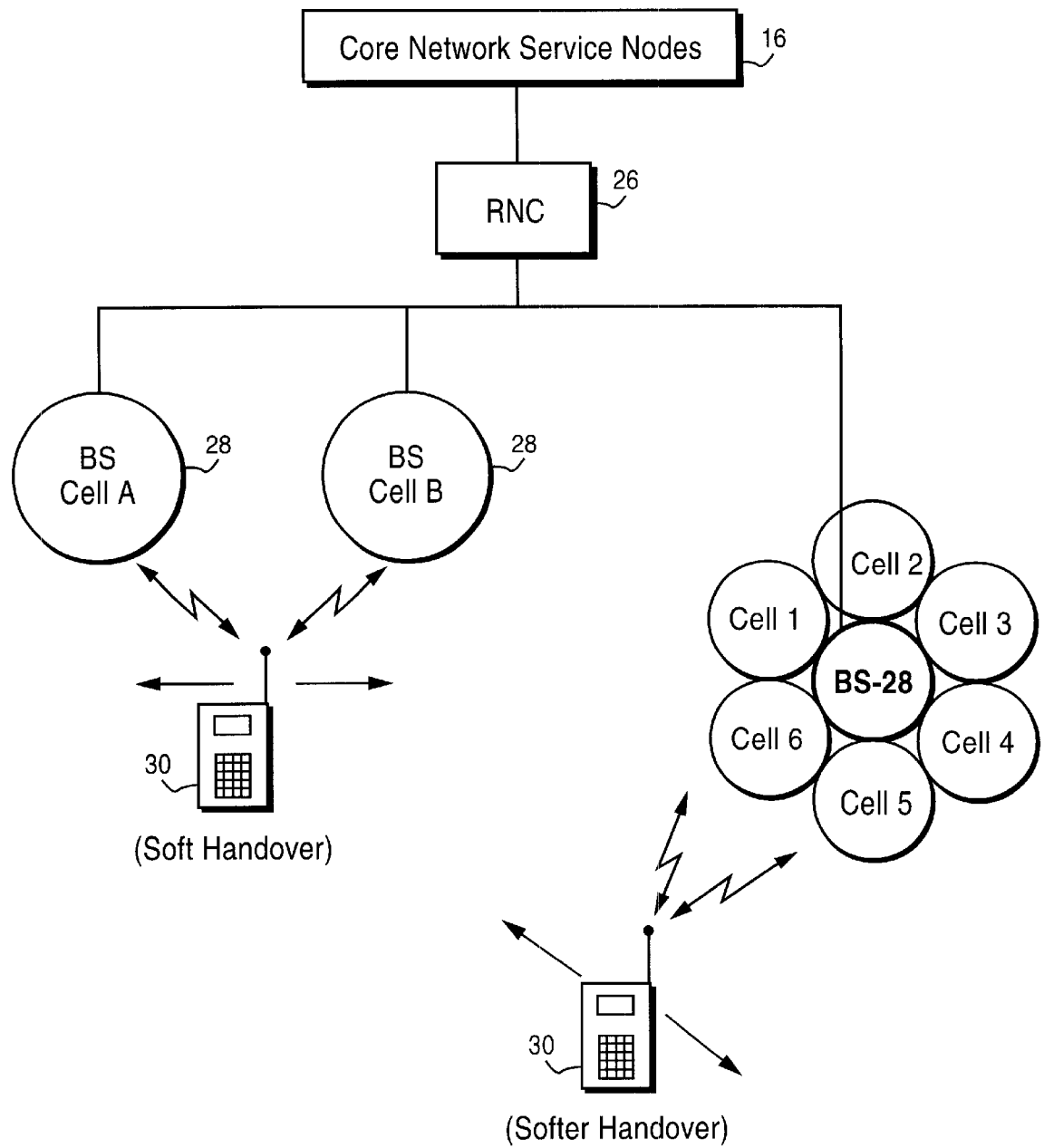
FIG. 6 is a function block diagram illustrating soft handover and softer handover in a mobile communications system.

FIG. 6 illustrates mobile stations in soft handover where a connection is established between a base station cell A and a base station cell B. Both base station cells A and B support a connection to the mobile station 30. Similarly, in the softer handover illustration, base station sector cells 5 and 6 each support a connection to the mobile station 30. As the mobile station 30 moves sufficiently far away from one of the pair of cells supporting connection to that mobile station, that connection is dropped or broken. However, it is often the case that a mobile station's location may oscillate near or about an overlapping area covered by both cells. As a result, the mobile station may very well move into and out of a handover with one or more cells. Each time a handover operation is reinitiated, the channel set-up and take down costs associated with that handover channel are incurred. In this example handover embodiment, the present invention substantially reduces that "cost."

Figure 1:
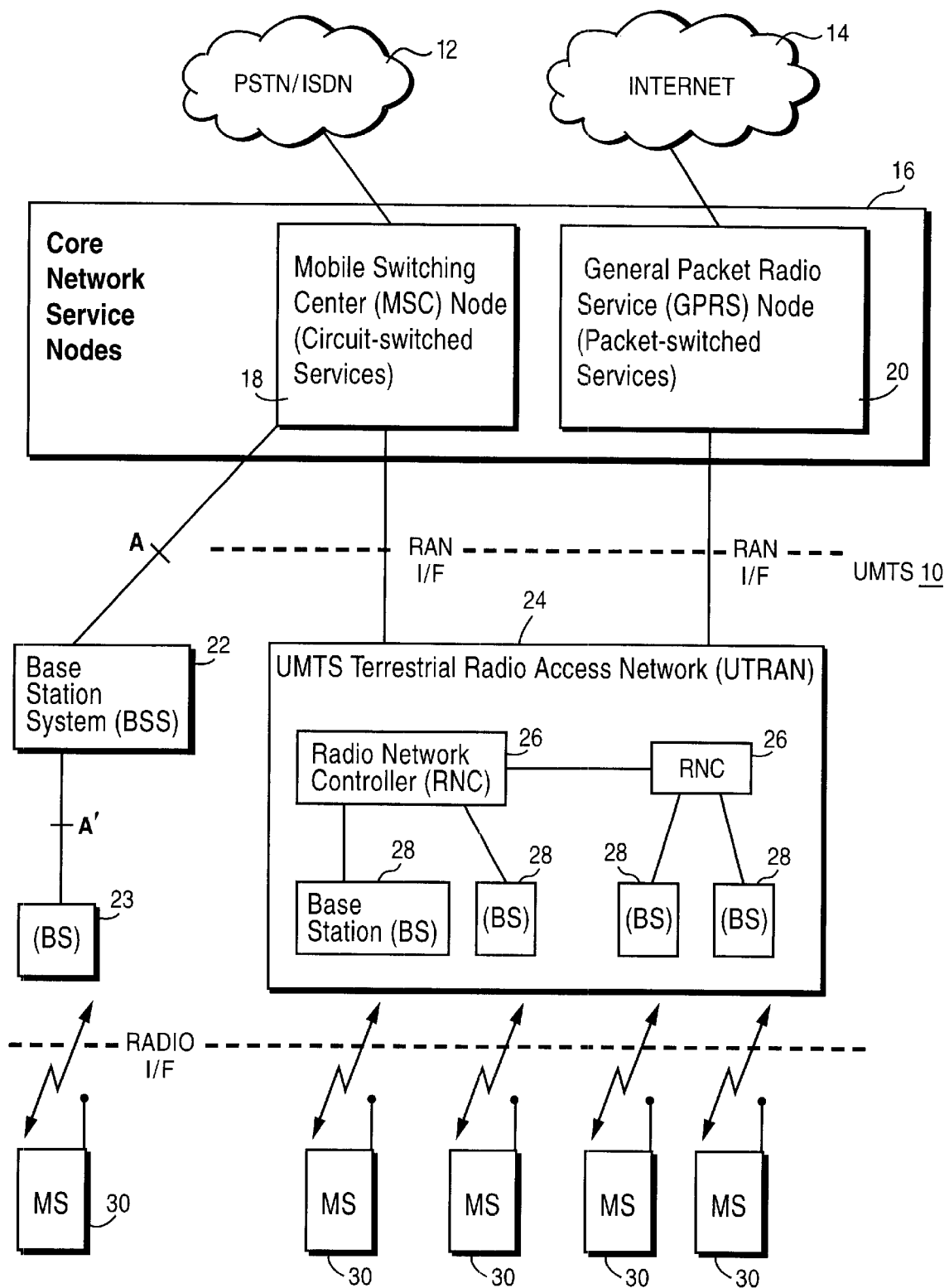
FIG. 1 is a function block diagram of an example mobile communications system in which the present invention may be employed.
Figure 7:
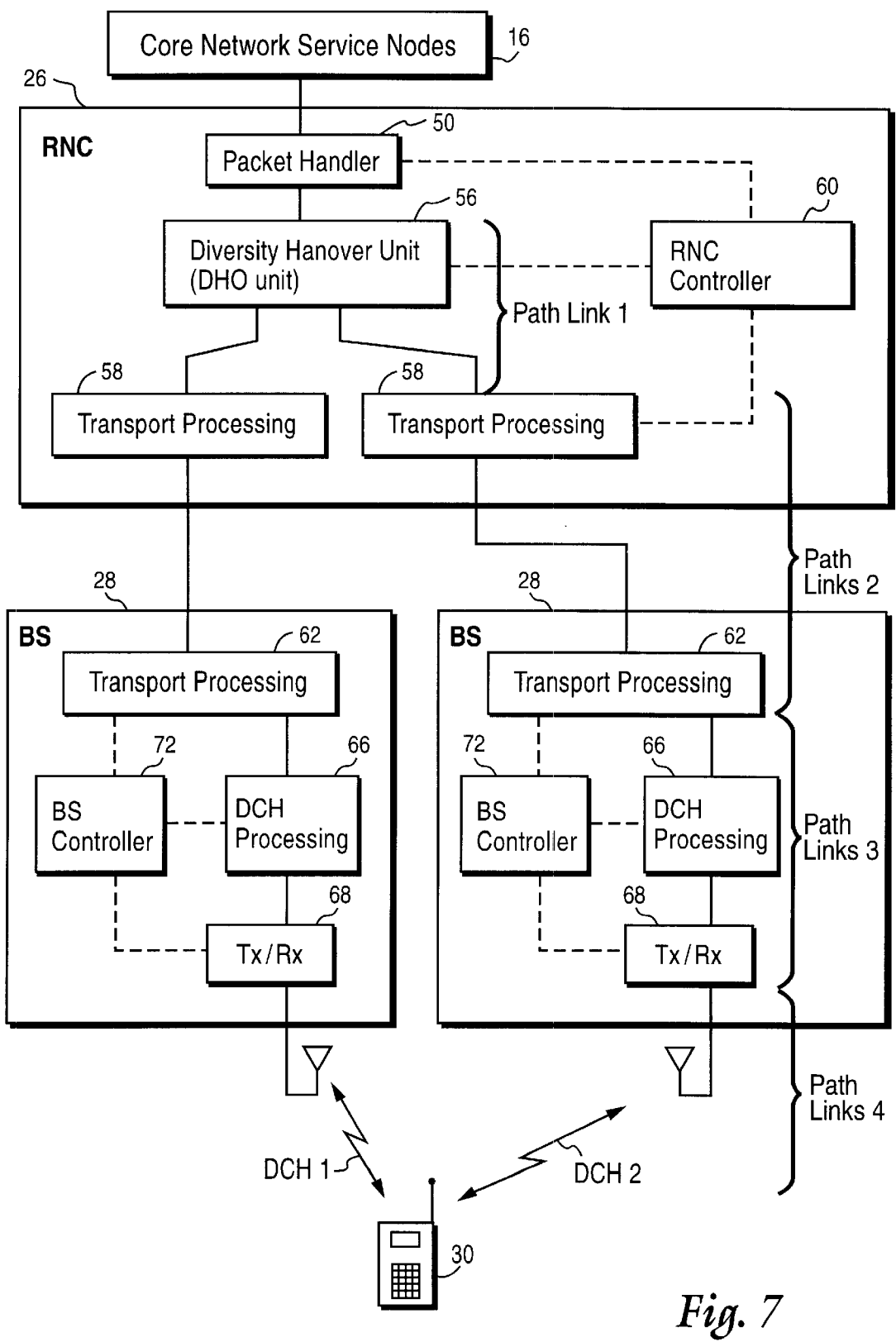
FIG. 7 is a function block diagram of a second example embodiment of the present invention applied to handover in the context of the system shown in FIG. 1.

Reference is made now to FIG. 7 which illustrates in function block format various path links that are employed in establishing a handover channel to support a mobile connection in a mobile communications system like that shown in FIG. 1. Because this example is in the context of a CDMA system which supports diversity handover between two base stations' cells, the description is directed to a diversity handover unit associated with dedicated channels DCH1 and DCH2 that are used to support a mobile connection. However, those skilled in the art will appreciate that the present application can also be employed for more than two base station cells, two or more sector cells, and in non-CDMA-based systems in which hard handover is employed.

As described above in conjunction with FIG. 3, a connection is established between a core network service node 16 and a mobile station 30 through the UTRAN 24. The packet handler 50 handling the packets to and from the core network service node 16 is coupled with a diversity handover unit 56 that is assigned to this dedicated channel to support the handover connection. A first portion of the dedicated channel labeled as path link 1 corresponds to the link between diversity handover unit 56 and transport processing entity 58. A second portion corresponds to the path links 2 coupling the two transport processing entities 58 (one for each base station) and the respective transport processing entities 62 in the two base stations 28 shown in FIG. 7 for DCH1 and DCH2. A third portion of the dedicated channels supporting the connection corresponds to the respective path links 3 in each of the two base stations 28 between respective transport processing entities 62 and the transceivers 68 for DCH1 and DCH2. Finally, the radio portions of the dedicated channels correspond to the path links 4 shown between the two base station transceivers 68 and the mobile station 30. As described above, the path links correspond to resources in, respectively, the RNC, resources for the RNC-BS transmission connection, resources in the base station, and radio resources. The functions of each path link or portion thereof are similar as above, e.g., establish/release resources within the nodes, signaling, and allocate/release radio resource, etc.

Figure 8:
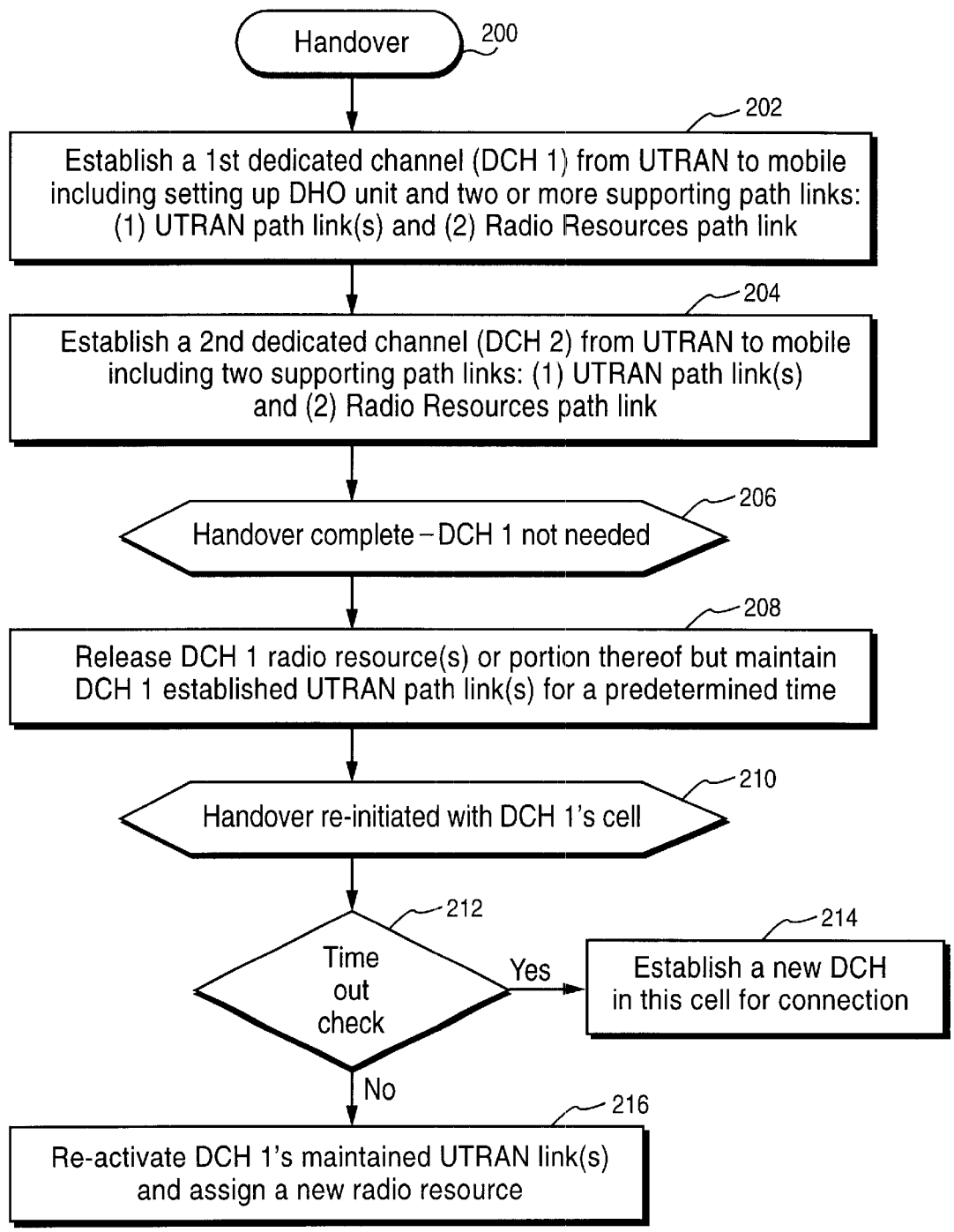
FIG. 8 is a flowchart diagram illustrating example procedures for implementing the second embodiment.

Example procedures that may be implemented in the handover example application of the present invention are now described in conjunction with the flowchart illustrated in FIG. 8. The RNC controller entity 60 establishes a first dedicated channel DCH1 from the UTRAN 24 to the mobile station 30 including setting up diversity handover unit 56 and two or more supporting path links. If there are two supporting path links, for example, the first may correspond to a path link through the UTRAN 24 and the second may correspond to the radio resource(s) path link between the UTRAN and the mobile station. Of course, as illustrated in FIG. 7, the UTRAN path links may also be broken down to plural path links such as path links 1–3 (block 202). Moreover, each path link may be broken down into plural portions, e.g., path link 4 may include a spreading code resource and a transmission power resource. A second dedicated channel DCH2 is established by the RNC controller entity 60 between the UTRAN 24 and the mobile station 30 including two or more supporting path links: one or more UTRAN path links and a radio resource(s) path link (block 204).

Block 206 indicates that the handover operation has been completed to the extent that the dedicated channel DCH1 supporting the connection to the mobile station 30 is no longer needed. The radio resource(s) or portion(s) thereof corresponding to path link 4 reserved for DCH1 is released in order to make them available for other mobile connections. In contrast, the other UTRAN path link(s) or portions thereof established for the dedicated channel DCH1 supporting the connection are maintained for a predetermined time period (block 208). Subsequently, a handover is reinitiated with the cell in which the dedicated channel DCH1 was originally assigned (block 210). A decision is made in the RNC controller entity 60 whether the predetermined time period has expired (block 212). If so, the maintained UTRAN path link(s) or portions thereof are released. Accordingly, a new dedicated traffic channel is established in this particular cell to support the connection to the mobile station using typical channel set-up procedures (block 214). On the other hand, if the time period has not yet expired, the RNC controller entity 60 simply reactivates the maintained UTRAN path link(s) for the dedicated channel DCH1 and assigns a new radio resource corresponding in FIG. 7 to path link 4 to support this connection.

Thus, as a mobile station moves back and forth between the two base station cells, the present invention saves data processing resources and reduces handover delays associated with channel set-up and take down by maintaining one or more path links in the UTRAN 24 for some predetermined period of time. As in the first example embodiment, one, some, all, or some portion of the UTRAN path links may be maintained for a predetermined period of time in order to facilitate an efficient channel-type switching operation in the context of handover.

If the path link 4 corresponding to radio resources is viewed as plural resources, only a portion of path link 4 corresponding to one of those radio resources may be released. For example, the spreading code resource may be maintained for a certain time period to avoid the costs of having to de-allocate and then soon thereafter re-allocate a spreading code for the connection. On the other hand, the transmission power resource could be released simply by stopping transmission. The only signaling needed between the RNC and the base station is a simple stop transmission command followed by a start transmission command if the path link 4 is to be re-established. These simple commands may be transferred in-band over the established transmission resource, i.e., the path link(s) between the base station and the RNC.

Thus, for the soft handover example, the following example procedures may be followed. First, establish the dedicated channel DCH1 to BS1 and the dedicated channel to DCH2 using corresponding radio resources including spreading code and transmission power resources. Then, the dedicated channel DCH1 is logically released by signaling to the mobile station. However, most of the resources reserved for DCH1 are maintained for a predetermined time period. Transmission on DCH1 is stopped by sending a STOP transmission message to BS1 on the reserved transport connection between the RNC and BS1. The spreading code remains reserved which reduces interference. When re-establishment of DCH1 is needed, the RNC sends another in-band signal, i.e., START transmission, on the transport connection to BS1 to activate transmission using the reserved, previously-assigned spreading code. The RNC then signals to the mobile station that DCH1 has been re-established.

Figure 9:
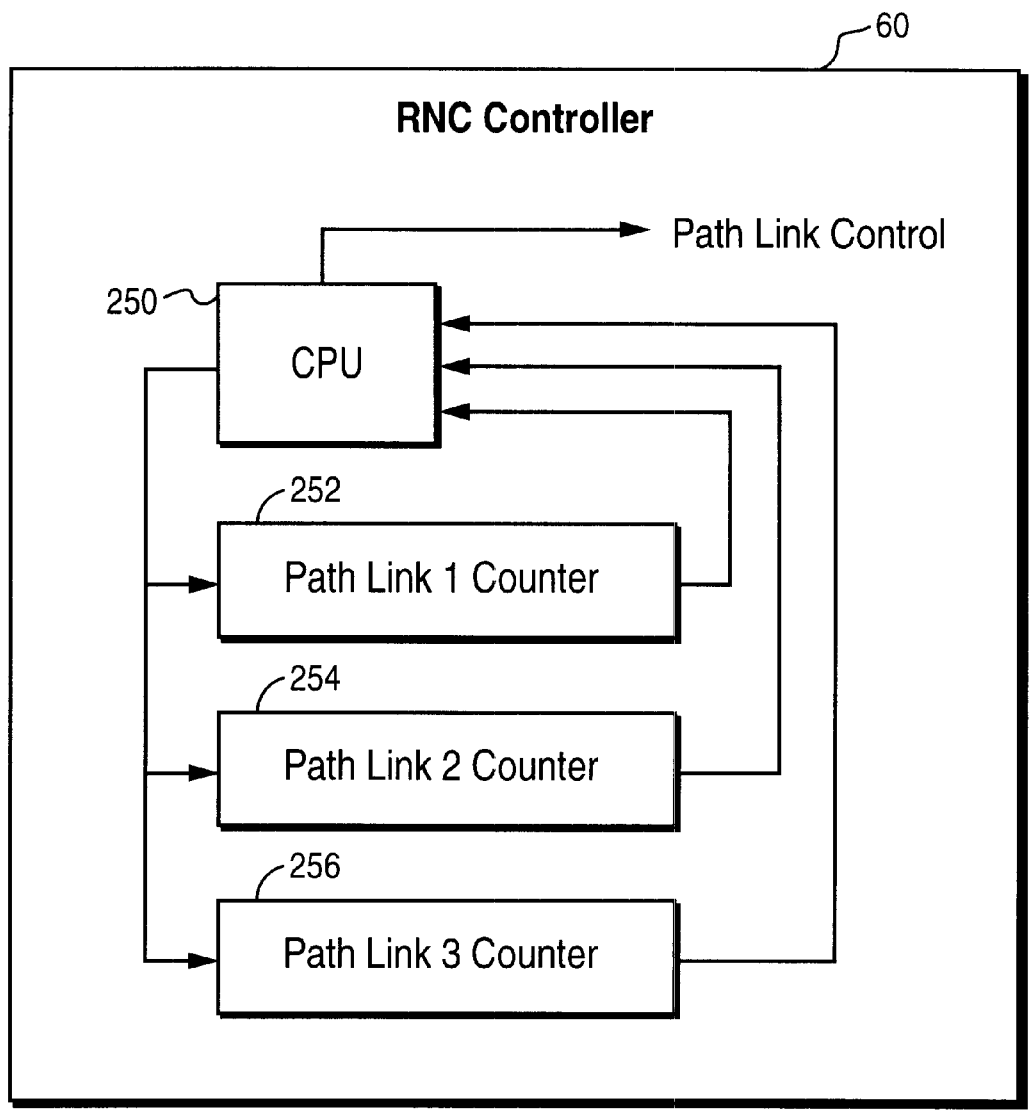
FIG. 9 is a function block diagram of an example implementation of an RNC controller that may be used in either of the first and second embodiments of the present invention.

Moreover, each maintained path link may have an associated counter. The example illustrated in FIG. 9 shows associated path link counters 252, 254, and 256 coupled to a CPU 250 in the RNC controller 60. More or less counters may be used depending on the number of links being maintained. If one of plural radio resources is maintained, a fourth counter could be used. When the RNC controller of the base station to which dedicated channel DCH1 is allocated detects that DCH1 is no longer needed, a signal is sent from the CPU 250 to each of the path link counters 252, 254, and 256 to initiate counting to permit either incrementing up to a preset value or decrementing down from a preset value to zero. Each of the counters may have its own corresponding count value which need not be the same as the count values associated with the other counters. The counters respectively count up or down to a corresponding expiration value, and upon reaching same, provide an indication to the CPU 250. The CPU 250 then generates a path link control signal which releases the corresponding UTRAN path link being maintained. These counters provide additional flexibility in that the various path links 1–3 may be handled separately depending upon their scarcity relative to the other path links.

While the present invention has been described with respect to a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. In a radio communications system including plural mobile stations and a radio network having plural base stations, a method comprising:

(a) initially establishing on a first type of channel a connection with a mobile station including establishing a first path link for the first channel from the radio network to a base station and a second path link for the first channel from the base station to a mobile station;

(b) switching the connection from the first channel to a second channel;

(c) thereafter, re-establishing the connection on the first channel by using at least a portion of the initially established first path link.

2. The method in claim 1, wherein the first and second channels are different types of channels.

3. The method in claim 1, wherein the first channel is a dedicated channel and the second channel is a common channel.

4. The method in claim 1, wherein the re-establishing step (c) further includes:

allocating a new second path link for the first channel to the connection.

5. The method in claim 1, wherein the second path link includes plural radio resources and the re-establishing step (c) further includes:

re-establishing the connection on the first channel by using at least one of the plural radio resources maintained from the initially established second path link and by allocating another new radio resource to the connection.

6. The method in claim 1, wherein the first path link includes plural portions, the re-establishing step (c) including using all of the plural portions initially established.

7. The method in claim 1, wherein for the re-establishing step (c), the initially established first path link is re-activated.

8. The method in claim 1, wherein the plural base stations are connected to a radio network controller, and wherein the first path link includes a first portion associated with a radio network control node, a second portion between the radio network control node and the one base station, and a third portion associated with the base station, and wherein the at least one portion corresponds to any one of the three portions.

9. The method in claim 8, wherein two of the three portions are used in the re-establishing step (c).

10. The method in claim 1, wherein the re-establishing step (c) including using only one portion radio resources allocated for the second path link.

11. The method in claim 1, further comprising:
maintaining at least a portion of the first path link for a predetermined period of time after the switching in step (b), and
detecting whether the predetermined period of time has expired;
if not, using at least the portion of the initially-established first link in the re-establishing step (c).

12. In a radio communications system including plural mobile stations and a radio network including plural base stations, a method where after establishing a first channel to support a connection through a radio access network to a mobile station, a portion of that first channel is maintained for a period of time after the first channel is no longer being used to support the connection, and subsequently, the maintained portion of the first channel is used to minimize a set-up cost associated with re-activating the first channel to again support the connection to the mobile station.

13. The method in claim 12, wherein the portion of the first channel is associated with resources within the radio access network and another portion of the first channel corresponds to a radio channel resource used to support the connection between the radio access network and the mobile station.

14. The method in claim 13, wherein the other portion of the first channel associated with one of plural radio channel resources is released after the first channel is no longer being used to support the connection in order to make available the one radio channel resource for other mobile communications.

15. The method in claim 12, further comprising:
establishing a value associated with the portion;
counting at the point when the first channel is no longer being used; and
releasing the maintained portion when the count reaches the value.

16. The method in claim 12, wherein the first channel is one of plural channels established between the mobile station and the radio access network employed in a handover operation.

17. The method in claim 16, wherein during the handover operation, the connection is handed over from a first radio access network cell where the first channel is established to a second radio access network cell where a second channel is established to support a connection through the radio access network to the mobile station.

18. The method in claim 12, wherein the first channel corresponds to a dedicated type of channel that is temporarily dedicated to the mobile station and the connection is switched to a second channel corresponding to a common type of channel that is not dedicated to a particular mobile station.

19. The method in claim 18, further comprising:
establishing a first value associated with the first sub-portion, a second value associated with the second sub-portion, and a third value associated with the third sub-portion;
counting at the point when the first channel is no longer being used; and
releasing the maintained first, second, or third portions when the count reaches to the first, second, or third values, respectively.

20. The method in claim 12, wherein the radio network includes a radio network control node connected to the plural base stations, and wherein the first channel includes several sub-portions including a first sub-portion associated with the radio network control node, a second sub-portion between the radio network control node and one of the base stations, and a third sub-portion associated with the one base station.

21. The method in claim 20, wherein the portion in claim 12 corresponds to one or more of the three sub-portions.

22. In a radio communications system including plural mobile stations and a radio network having plural cells coupled to a radio network controller, each cell associated with a base station, a handover method comprising:
initially establishing on a first channel in a first cell a connection with a mobile station, the first channel having plural links;
establishing on a second channel in a second cell the connection with the mobile station;
releasing the first channel so that it no longer supports the first connection with the mobile station;
maintaining one or a portion of one of the plural links of the first channel; and
activating the maintained link of the dropped channel or portion thereof when the connection is re-established in the first cell with the mobile station.

23. The method in claim 22, wherein the first cell corresponds to a first base station and the second cell corresponds to a second base station, and wherein the handover is a hard handover.

24. The method in claim 22, wherein the first cell corresponds to a first base station and the second cell corresponds to a second base station, and wherein the handover is a soft handover.

25. The method in claim 22, wherein the first cell corresponds to a first base station sector and the second cell corresponds to a second base station sector, and wherein the handover is a softer handover.

26. The method in claim 22, wherein another of the plural links corresponds to plural radio channel resources used to support the connection between the radio access network and the mobile station, the releasing step including releasing one of the radio channel resources in order to make available the one radio channel resource for other mobile communications.

27. The method in claim 26, further comprising:
establishing a value associated with the one link;
counting at the point when the first channel is dropped; and
releasing the maintained link when the count reaches the value.

28. In a radio communications system including plural mobile stations and a radio network having plural base stations, a radio network control node comprising:
a channel type switch for selecting one of a first type of channel and a second type of channel to support a connection with a mobile station;
a controller initially establishing on the first channel the connection with a mobile station where the first channel includes first and second channel links, and thereafter, controlling the channel type switch to switch the connection from the first channel to the second type of channel,
wherein the controller controls the channel type switch to switch the connection from the second channel to the first channel and re-establishes the connection on the first channel by using a portion of the initially-established first or second channel link.

29. The radio network control node in claim 28, wherein the radio network control node is a base station.

30. The radio network control node in claim 28, wherein the radio network control node is coupled to plural base stations, the controller establishing a first path link for the first channel from the radio network to a base station and a second path link for the first channel from the base station to the mobile station.

31. The radio network control node in claim 30, wherein the first path link includes a first resource within the RNC between the channel switch and a transport processing interface, a second transmission resource between the transport processing interfaces of the RNC and a base station, and a third resource within the base station between the base station transport processing interface and a radio transceiver, and wherein the at least one portion corresponds to any one of the first, second, or third resources.

32. The radio network control node in claim 28, further comprising:

a first counter for the first link detecting whether a first predetermined period of time has expired;

a second counter for the second link detecting whether a second predetermined period of time has expired; and a third counter for the third link detecting whether a third predetermined period of time has expired, wherein when the first, second, or third counter detects expiration of the first, second, or third time period, respectively, the controller releases the maintained first, second, or third links respectively.

33. The radio network control node in claim 28, wherein the second path link includes plural radio resources and the controller allocates a new one of the plural radio resources and uses another one of the plural radio resources initially established for the first channel link when the first channel is re-established to support the connection.

34. The radio network control node in claim 28, wherein the controller maintains at least a portion of the first path link for a predetermined period of time after switching the connection to the second channel, the radio network control node further comprising:

a counter corresponding to the first path link detecting whether a predetermined period of time has expired, and wherein the counter has detects expiration of the time period, the controller releases the maintained first link.

35. In a radio communications system including plural mobile stations and a radio network having plural cells coupled to a radio network controller, each cell associated with a base station, apparatus, comprising:

means for initially reserving a first channel in a first cell to support a connection with a mobile station;

means for establishing on a second channel in a second cell the connection with the mobile station;

means for releasing the first channel so that it no longer supports the first connection with the mobile station;

means for maintaining a portion of the first channel; and means for activating the maintained portion of the first channel when the connection is re-established in the first cell with the mobile station.

36. The apparatus in claim 35, wherein the first cell corresponds to a first base station and the second cell corresponds to a second base station, and wherein the handover is a soft handover.

37. The apparatus in claim 35, wherein the first cell corresponds to a first base station sector and the second cell corresponds to a second base station sector, and wherein the handover is a softer handover.

38. The apparatus in claim 35, wherein the means for maintaining maintains one or more channel links associated with the radio network and the first cell while a channel link or portion thereof from the first cell to the mobile station is released to be available for use in other connections.

39. In a radio communications system including plural mobile stations and a radio network having plural cells coupled to a radio network controller, each cell associated with a base station, a method comprising:

initially reserving a first channel to support a connection with a mobile station, the first channel having plural resources supporting the connection between a base station and a mobile station;

establishing on a second channel the connection with the mobile station;

releasing one of plural resources for the first channel so that it no longer supports the connection with the mobile station;

maintaining another of the plural resources for the first channel; and activating the maintained resource of the first channel when the first channel is re-established to again support the connection with the mobile station.

40. The method in claim 39, wherein the one radio resource includes a transmission power resource and the other radio resource includes a spreading code.

* * * * *